Dec. 16, 1969    A. RASIEL ET AL    3,484,624
ONE-SHOT PULSE GENERATOR CIRCUIT FOR GENERATING
A VARIABLE PULSE WIDTH
Filed Dec. 23, 1966

AMRAM RASIEL
WILLIAM M. HENEBRY
INVENTORS

BY *Ralph L. Cadwallader*
*Cadwallader and Kelly*

ATTORNEYS

United States Patent Office 3,484,624
Patented Dec. 16, 1969

3,484,624
ONE-SHOT PULSE GENERATOR CIRCUIT FOR GENERATING A VARIABLE PULSE WIDTH
Amram Rasiel, Rockport, and William M. Henebry, Marblehead, Mass., assignors to EG & G, Inc., Bedford, Mass., a corporation of Massachusetts
Filed Dec. 23, 1966, Ser. No. 604,456
Int. Cl. H03k 1/18
U.S. Cl. 307—265                3 Claims

ABSTRACT OF THE DISCLOSURE

A pulse generator, for generating a pulse of desired pulse width upon application of an initiating pulse, has input switching means connected to a timing capacitor, a current source adapted to charge the timing capacitor at a predetermined rate, a comparator circuit that compares the voltage on the capacitor with a reference voltage and provides an output when the reference voltage is exceeded, a reference voltage circuit connected to the comparator circuit that provides either one of two reference voltages depending on whether the timing capacitor is charging or discharging and reset means interposed between the comparator circuit and the input switching means that holds the entire circuit insensitive to any initiating pulses during discharge of the timing capacitor.

Background of the invention

Many timing circuits are employed to generate predetermined time intervals upon the application of an initiating pulse, the time interval being represented by a pulse of desired time duration. Two basic problems arise in this type of circuit that often limit its practical usefulness. First, the circuit is sensitive to pulses other than the initiating pulse during recovery after the time interval (pulse) has been generated and second, its recovery time is too long. In the prior art these problems are often solved by adding other circuitry. Our invention provides a unique solution to these problems with a minimum of components. The advantages of the invention evolve about the reference voltage circuit that provides alternate reference voltages during charging and discharging of the timing capacitor. By use of this simple circuit any initiating pulses that occur during discharge of the timing capacitor are automatically locked out preventing intermittent charging of the timing capacitor during capacitor discharge. Lockout continues until the timing capacitor is fully discharged, as hereinafter explained.

Summary of the invention

The pulse generator of the present invention has switching means that, in its initial state clamps a timing capacitor discharged until an initiating pulse switches the switching means, thereby unclamping the capacitor. The beginning of the time interval, as represented by the leading edge of the output pulse generated by the switching means, commences when the unclamped capacitor starts charging from a current source. A comparator circuit compares the increasing capacitor voltage with a first reference voltage and when their voltage amplitudes are equal the comparator circuit switches to a second state thereupon actuating the reset means. The capacitor is immediately clamped because the actuated reset means switches the switching means back to its initial state thereby terminating the output pulse. The timing capacitor then discharges very rapidly through the low impedance of the switching means resulting in a very rapid recovery time. Effectively, the switching means clamps the capacitor to ground when in its initial state. Upon termination of the output pulse the circuit is rendered insensitive to other pulses by operation of the reference voltage circuit which is connected between an output of the comparator circuit and its reference input. When the comparator circuit switches to its second state the reference voltage circuit changes to a second reference voltage. Thus, while the timing capacitor is discharging the comparator circuit will not switch back to its initial state until the capacitor voltage is less than the second reference voltage, or essentially until the capacitor is discharged. With the comparator circuit maintained in its second state until the capacitor is discharged, the reset means will maintain the switching means in its initial state during which time input pulses cannot actuate the switching means.

An object of this invention is to provide an improved one-shot pulse generator circuit that exhibits a short recovery time.

A further object of this invention is to provide an improved one-shot pulse generator circuit that prevents input triggering during the short recovery time.

The novel features that characterize this invention are set forth with particularity in the appended claims. The invention itself, however, as to its mode of operation and additional features and advantages, will best be understood from the following description when read in conjunction with the accompanying drawings, in which:

Principle of the invention

Figure 1:
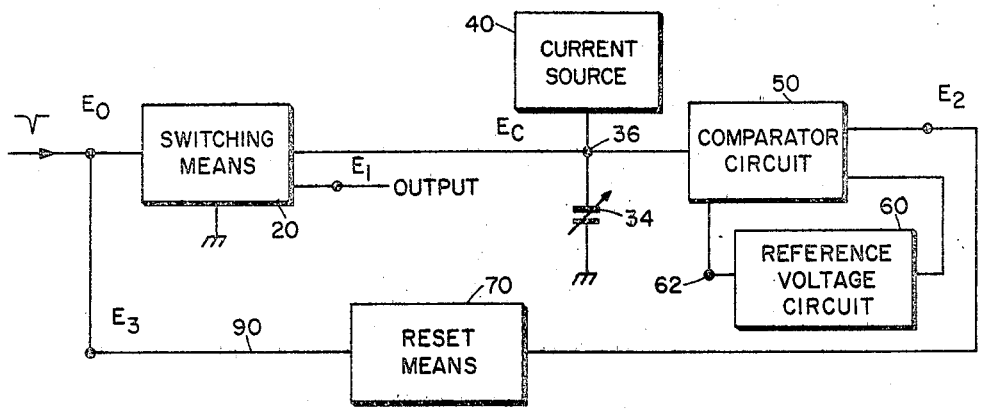
FIG. 1 is a block diagram of the pulse generator of the present invention.

FIG. 1 illustrates in block diagram form the pulse generator of the present invention. Current source 40 connects to capacitor 34 at node 36 and may be adapted to charge capacitor 34 at a constant rate, an exponential rate or at some other predetermined rate with respect to time.

Figure 2:
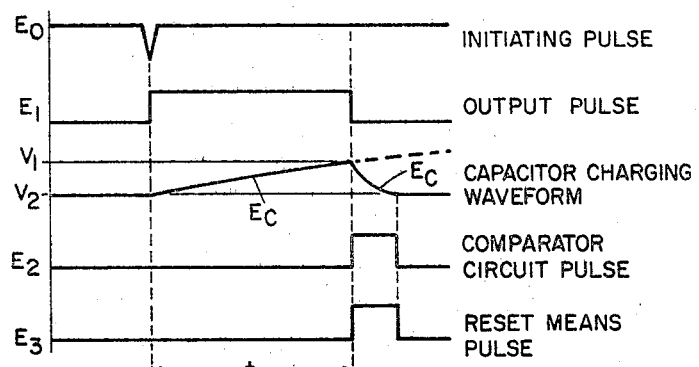
FIG. 2 illustrates waveforms associated with the pulse generator of FIG. 1.

Before the circuit is excited by an initiating pulse, such as pulse $E_0$ depicted in FIGURE 2, node 36 and capacitor 34 are clamped at substantially ground potential by the initial state of switching means 20. The initiating pulse, which may be of short duration, latches switching means 20, unclamping capacitor 34. Switching means 20 may be one of various bistable devices such as a flip-flop. Also connected to capacitor 34 at node 36 is comparator circuit 50 which compares increasing capacitor voltage $E_c$ at node 36 with reference voltage $V_1$ initially established at node 62 by reference voltage circuit 60.

Comparator circuits are well known in the art. However, comparator circuit 50 has been adapted to switch to a second state when capacitor voltage $E_c$ just exceeds reference voltage $V_1$, at which time reference voltage circuit 60 changes reference voltages; establishing a lower reference voltage $V_2$ at node 62. This change in reference voltages and the unique operation of reference voltage circuit 60 will be described in detail hereinafter.

When comparator circuit 50 changes to its second state, reset means 70 is actuated and remains actuated until comparator circuit 50 returns to its initial state. The output of reset means 70 is connnected via conductor 90 to the input of switching means 20. Reset means 70 could be no more than a conductor if the comparator circuit output were adequate to prevent switching of switching means 20 during discharge of capacitor 34. When reset means 70 is actuated previously latched switching means 20 switches back to its initial state, and capacitor 34 immediately starts to discharge. If during this short discharge time, as shown by $E_c$ in FIGURE 2, any input pulse should try to actuate switching means 20, the output of reset means 70 will prevent actuation of switching means 20, thus effectively locking out all input pulses. When capacitor 34 is fully discharged comparator circuit 50 switches to its first state because voltage $E_c$ is then lower than second reference voltage $V_2$ (see FIG. 2). When comparator circuit 50 switches to its first state, reference voltage circuit 60 changes back to reference voltage $V_1$, reset means 70 becomes inoperative, and an input pulse can then switch switching means 20, unclamping capacitor 34 again.

FIGURE 2 shows the pulse waveforms present at key points of the pulse generator of FIGURE 1. The polarities depicted are for illustrative purposes only. The initiating pulse is shown as $E_0$ and the output pulse is depisted as $E_1$ at the output of switching means 20. The charge and discharge waveforms of capacitor 34 are shown as $E_c$. Reference voltage $V_1$ and $V_2$ are also shown. The predetermined time "$t$" is fixed by the time required for capacitor 34 to charge to reference voltage $V_1$. The output pulses of comparator circuit 50 and reset means 70 are shown, respectively, as $E_2$ and $E_3$. Note that pulse $E_3$ remains on until capacitor 34 has discharged to a potential below $V_2$, thus preventing actuation of switching means 20 during that time.

Figure 3:
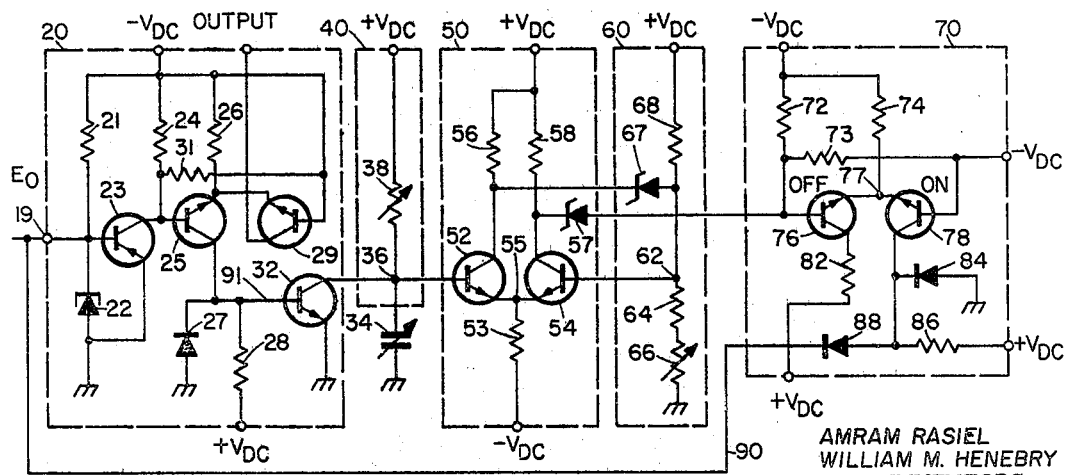
FIG. 3 is a schematic diagram of an embodiment of the invention.

Embodiment of FIGURE 3

FIGURE 3 illustrates schematically one embodiment of the present invention. As there illustrated, tunnel diode 22 and transistors 23, 25, 29 and 32 comprise switching means 20. Prior to application of initiating pulse $E_0$, tunnel diode 22 is in its low-voltage state, transistors 23 and 25 are off, transistor 29 is on and transistor 32 normally conducts the base current supplied by $+V_{DC}$ through resistor 28. In effect capacitor 34 is clamped, initially, through the emitter-collector junction of transistor 32 to essentially ground. Comparator circuit 50 comprises a standard current switching pair, transistors 52 and 54, with transistor 52 normally cutoff and transistor 54 normally conducting. The two voltages it compares appear at node 36, which is the voltage on capacitor 34 as it charges and discharges, and the reference voltage at node 62 which is the reference voltage supplied by reference voltage circuit 60. Resetting is provided by reset means 70 comprising the current switching pair, transistor 76 which is normally cutoff and transistor 78 which normally conducts. When referring above to the normal mode of certain transistors it is to be understood that this is at a time prior to application of the initiating pulse. A detailed explanation of circuit operation follows.

With the illustrated arrangement of transistors a negative-going initiating pulse is needed to switch tunnel diode 22 from its initial low-voltage state to its high-voltage state. It will be apparent that the circuit can be adapted to a positive-going initiating pulse. For example, an inverter circuit may be connected at the input. Resistor 21, connected from the cathode of tunnel diode 22 to the negative voltage supply, $-V_{DC}$, biases tunnel diode 22 such that it will remain in its high-voltage state after a sufficiently large initiating pulse is applied while in its low-voltage state. The negative-going initiating pulse $E_0$, switches tunnel diode 22 to its high-voltage state. The resetting of tunnel diode 22 to its low-voltage state is accomplished by reset means 70 at a later time as will be hereinafter explained. When tunnel diode 22, which is connected between the base and emitter of transistor 23, switches to its high-voltage state, transistor 23 which was normally cutoff, will conduct. Transistors 25 and 29 form a current switching pair having their emitters tied to a common point through resistor 26 to negative voltage supply, $-V_{DC}$. Resistor 24, connected from the base of transistor 25 to negative voltage supply, $-V_{DC}$ and resistor 31, connected from the base of transistor 25 to the base of transistor 29, form a voltage divider keeping transistor 29 normally on. The base of transistor 29 is connected to negative voltage supply, $-V_{DC}$ and the collector of transistor 29 is the output. As transistor 23 turns on, its collector voltage, which is applied to the base of transistor 25, rapidly increases sufficiently to turn transistor 25 on thereby turning off transistor 29. Diode 27 connects the collector of transistor 25 to ground; resistor 28 connects it to positive voltage supply, $+V_{DC}$ and conductor 91 connects it to the base of transistor 32. With transistor 25 conducting, the current in its collector exceeds the current from resistor 28, diode 27 forward biases and transistor 32 is back-biased and therefore, cutoff.

The positive voltage supply, $+V_{DC}$, now commences to charge capacitor 34 through resistor 38. The collector of transistor 32 is connected through resistor 38 to positive voltage supply, $+V_{DC}$, through capacitor 34 to ground and directly to the base of transistor 52. With a nominal supply voltage, the voltage at node 36, $E_c$, increases exponentially toward the value of positive voltage supply $+V_{DC}$. If it is desired that $E_c$ increase linearly the value of positive voltage supply, $+V_{DC}$, and the value of resistor 38 can be increased so that the portion of the exponential voltage waveform that is employed fairly accurately represents a ramp-type function. It will be apparent that resistor 38 and supply voltage, $+V_{DC}$, may be replaced with a current source. In this embodiment, resistor 38, shown as a variable resistor, can be adjusted along with capacitor 34 to fix predetermined time "$t$."

As previously mentioned comparator circuit 50 comprises current switching pair, transistors 52 and 54, with transistor 52 normally cutoff and transistor 54 normally conducting. Resistors 56 and 58 are load resistors connected from the collectors of transistors 52 and 54, respectively, to positive voltage supply $+V_{DC}$. The emitters of transistors 52 and 54 are connected at common point 55 through resistor 53 to negative voltage supply $-V_{DC}$. Comparator circuit 50 compares the voltage at node 36, $E_c$, which is the voltage on capacitor 34, with a reference voltage. This reference voltage is the voltage at node 62 which is established by reference voltage circuit 60 and which assumes two different values depending on the switching state of comparator circuit 50. As long as the reference voltage, $V_1$, at node 62 exceeds voltage, $E_c$, at node 36, while capacitor 34 charges, comparator circuit 50 remains in its initial state as described above. As voltage $E_c$ starts to exceed reference voltage $V_1$, transistor 52 saturates, transistor 54 turns off and comparator circuit 50 rapidly switches to its second state. On switching to this second state the collector voltage of transistor 52 decreases while the collector voltage of transistor 54 increases. The increased voltage on the collector of transistor 54 actuates reset means 70 which switches switching means 20 back to its initial state thereby rapidly discharging capacitor 34, as hereinafter explained.

Reference voltage circuit 60 prevents comparator circuits 50 from switching back to its initial state until capacitor 34 is discharged. Reference voltage circuit 60 comprises Zener diode 67, resistors 64 and 68 and variable resistor 66. By adjusting variable resistor 66, an initial reference voltage, $V_1$, is provided. Variable resistor 66 and resistor 64 are connected in series from node 62 to ground while resistor 68 is connected from node 62 to positive voltage supply $+V_{DC}$. Zener diode 67 connects between node 62 and the collector of transistor 52 of comparator circuit 50. With comparator circuit 50 in its initial state, with transistor 52 cutoff, Zener diode 67 operates in the usual Zener mode, back-biased, and current flows from $+V_{DC}$, through resistor 56 and Zener diode 67 to resistors 64 and 66 to ground. Current also flows from $+_{DC}$, through resistor 68 (which has a high resistance compared to the sum of the resistances of resistors 64 and 66) to resistors 64 and 66 to ground. The sum of these currents and the total resistance of resistors 64 and 66 fix the value of reference voltage $V_1$. Reference voltage $V_1$ is adjusted to a positive value somewhere between a small positive voltage and a voltage equal to the positive voltage supply +V$_{DC}$. When comparator circuit 50 switches to its second state, that is, when E$_c$ at node 36 exceeds reference voltage V$_1$, the voltage at the collector of transistor 52 decreases and Zener diode 67 conducts in neither direction (it is actually back-biased drawing no current). This change of comparator circuit 50 to its second state is communicated by way of Zener diode 67 to reference voltage circuit 60 so that a second reference voltage V$_2$ will be established at node 62. When Zener diode 67 stops conducting current is supplied to resistors 64 and 66 only through resistor 68 from +V$_{DC}$. This current fixes the value of reference voltage V$_2$. By employing a large value for resistor 68 reference voltage V$_2$ which corresponds to the second state of comparator circuit 50, is approximately equal to ground potential. Essentially reference voltage circuit 60 produces reference voltages V$_1$ and V$_2$ that corresponds, respectively, to the first and second states of comparator circuit 50. It can now be seen that when capacitor 34 discharges, as hereinafter explained, comparator circuit 50 will not switch back to its first state until the voltage at node 36 is less than the voltage at node 62, meaning that E$_C$ must be less than V$_2$. This means that capacitor 34 must be discharged.

Resetting is accomplished by way of Zener diode 57 when comparator circuit 50 switches to its second state. Reset means 70 comprises current switching pair, transistor 76 which is normally cutoff and transistor 78 which normally conducts. The emitters of transistors 76 and 78 are connected to node 77 and from the through resistor 74 to negative voltage supply —V$_{DC}$. Resistors 72 and 73 form a voltage divider with the junction of the two resistors connected to the base of transistor 76. The anode of Zener diode 57 connects to the base of transistor 76 and its cathode connects to the collector of transistor 54. Resistor 82 is a typical load resistor for transistor 76 and resistor 86 is likewise a load resistor for transistor 78. Diode 84 normally clamps the collector voltage of transistor 78 not allowing it to go more negative than the forward drop of diode 84. Initially the base of transistor 76 is biased more negatively than the fixed bias on the base of transistor 78 and transistor 76 is cutoff with transistor 78 conducting. When reset means 70 is actuated, that is when the collector of transistor 54 becomes more positive, this is communicated through Zener diode 57 to the base of transistor 76 which then becomes more positive than the base of transistor 78 thereby turning on transistor 76 and turning off transistor 78. Diode 84 which had been forward biased now reverse biases when transistor 78 turns off. The current available from resistor 86 which had been flowing in transistor 78 now flows through diode 88 and conductor 90 to input terminal 19 of the pulse generator circuit. The forward current flowing through diode 88 when reset means 70 is actuated resets tunnel diode 22 to its low-voltage state. This current will be sufficient to keep tunnel diode 22 in its low-voltage state as long as reset means 70 is actuated and even though input pulses are applied that normally would switch tunnel diode 22 to its high-voltage state. It must be kept in mind that reset means 70 will be actuated as long as comparator circuit 50 is in its second state. Therefore, this lockout feature provided by reset means 70 will prevent operation of the pulse generator circuit again until comparator circuit 50 switches back to its first state, or in other words, until capacitor 34 is discharged. Reset means 70, as previously mentioned, can be eliminated if comparator circuit 50 has sufficient output capabilities.

The rapid response of reset means 70 immediately commences resetting of the entire circuit with the entire circuit displaying a very rapid recovery time. As previously mentioned, during reset, tunnel diode 22 switches to its low-voltage state. Transistor 23 will turn off as will transistor 25. This means that the current available from resistor 28 is forced to flow into the base of transistor 32 turning that transistor on very rapidly. The voltage across capacitor 34, E$_c$, which at that instant is just slightly greater than the initial reference voltage V$_1$, will discharge rapidly through the small impedance represented by the saturation resistance of transistor 32. Because of the aforementioned change in reference voltages, comparator circuit 50 will not return to its initial state until capacitor 34 has become discharged at which time transistor 54 saturates, transistor 52 turns off, and comparator circuit 50 rapidly switches back to its initial state. Reset means 70 immediately returns to its normal state and the lockout feature provided by the current through diode 88 from resistor 86 ceases. Zener diode 67 starts conducting and reference voltage circuit 60 changes the reference voltage to V$_1$.

It will be apparent from the foregoing disclosure of the invention that numerous modifications, changes and equivalents will now occur to those skilled in the art, all of which are intended to fall without the true spirit and scope of the invention as contemplated by the appended claims.

We claim:

1. In a pulse generator that is adapted to charge a capacitor at a predetermined rate from a current source, the combination comprising:

switching means connected to said capacitor and said current source, adapted in its initial state to clamp said capactior to ground fully discharged, and upon application of an input pulse to unclamp said capacitor, allowing said capacitor to charge from said current source;

comparator circuit means having one input connected to said capacitor and adapted to change from a first state to a second state when the voltage on said capacitor exceeds a first reference voltage and to change back to said first state when a second reference voltage exceeds the voltage on said capacitor;

reference voltage means connected to another input of said comparator circuit means and adapted to provide said first reference voltage while said capacitor charges and when said comparator circuit means changes to said second state to provide said second reference voltage of such value that said capacitor discharges to approximately ground potential before said comparator circuit means can change back to said first state; and reset means interposed between said comparator circuit means and the input of said switching means and adapted to switch said switching means back to its initial state when said comparator circuit means changes to its said second state and to maintain said switching means in its inital state until said comparator circuit means changes back to its said first state, thereby preventing said switching means from unclamping said capacitor as long as said comparator circuit means is in its said second state.

2. A pulse generator circuit as in claim 1 in which said reference voltage means comprises:

two resistors connected in series between a power supply and ground, the voltage at the junction of said resistors providing said reference voltages; and a Zener diode connected between the junction of said resistors and the output of said comparator circuit means and so poled as to conduct additional current through one of said resistors when said comparator circuit means is in its first state and to cease said conduction when said comparator circuit means changes to its second state thereby changing from said first reference voltage to said second reference voltage 3. A pulse generator circuit for generating a pulse of desired pulse width comprising:

a capacitor;

a current source connected to said capacitor;

switching means connected to said capacitor and said current source having:

a tunnel diode adapted to switch to its high-voltage state upon application of an input pulse and to return to its low-voltage state upon application of a reset pulse, and a clamping transistor, having its emitter grounded and its collector connected to said capacitor, and adapted to maintain said capacitor discharged until said tunnel diode switches to its high-voltage state at which time said clamping transistor becomes cutoff allowing said capacitor to charge from said current source;

a comparator circuit having first and second transistors connected with their emitters common as a current switching pair and arranged to compare the voltages at the bases of said transistors, the base of said first transistor being connected to said capacitor to monitor the voltage thereon, the outputs from said comparator circuit being at the collectors of said transistors;

a reference voltage circuit comprising:

first and second resistors connected in series between power supply and ground, the junction of said resistors being connected to the comparator circuit at the base of its second transistor thereby providing a reference voltage thereto, and a Zener diode connected between the junction of said resistors and the output of said comparator circuit at the collector of its first transistor and so poled as to conduct additional current through said second resistor to ground when said comparator circuit is in its first state and to cease said conduction when said comparator circuit changes to its second state thereby changing said reference voltage from a first value to a second value; and reset means interposed between said comparator circuit at the collector of its second transistor and the input of said switching means and adapted to switch said tunnel diode to its low-voltage state when said comparator circuit changes to its said second state and to maintain said tunnel diode in its low-voltage state until said comparator circuit changes back to its said first state, thus preventing said switching means from unclamping said capacitor as long as said comparator circuit is in its said second state.

References Cited

UNITED STATES PATENTS 3,277,319  10/1966  Stevens _____ 307—265
3,339,088  8/1967   Dillard _____ 307—228 X
3,358,159  12/1967  Smith _____ 307—228

DONALD D. FORRER, Primary Examiner

S. D. MILLER, Assistant Examiner

U.S. Cl. X.R.

307—228, 235, 286; 328—58, 185, 146